United States Patent Office 3,109,779
Patented Nov. 5, 1963

3,109,779
PROCESS FOR THE PRODUCTION OF 6-AMINO-PENICILLANIC ACID
Ernst Brandl and Walter Kleiber, Tyrol, Austria, assignors to Biochemie Gesellschaft mit beschränkter Haftung, Kundl, Tyrol, Austria, a company of Austria
No Drawing. Filed Mar. 29, 1962, Ser. No. 183,415
Claims priority, application Austria Mar. 31, 1961
12 Claims. (Cl. 195—36)

The present invention is concerned with the production of 6-aminopenicillanic acid by the enzymatic cleavage of penicillin.

6-aminopenicillanic acid was first prepared in 1950 by Sakaguchi and Murao by the cleavage of penicillin G with the aid of the mycelium of penicillium strain Q 176. Batchelor and co-workers later recognised the importance of 6-aminopenicillanic acid as a starting material for the chemical production of new penicillins, and they described the production of the acid by fermentation without a precursor. However, in view of the very small yields that are obtained and the subtle techniques required for isolating and purifying the product, their process is not suitable for the large scale production of 6-aminopenicillanic acid.

It has also been proposed to bring about the enzymatic cleavage of penicillins for the purpose of producing 6-aminopenicillanic acid with the help of diverse bacteria, actinomycetes and fungi. In these methods the microorganisms which contain the active enzyme are subjected to a process of vacuum freeze drying, or the cells, because of their low enzymatic activity, must be applied in the form of dense suspensions. Other organisms used in carrying out various processes yield very little 6-aminopenicillanic acid or they form pigments and other products of metabolism which hinder the further treatment of the cleavage mixture and the purification of the final product. Many of the microorganisms which have been proposed for effecting cleavage make very special demands upon the nutrient medium and the conditions of fermentation, or they have an undesirable substrate specificity.

It has now been found that *Pleurotus ostreatus* of the class of Basidiomycetes is exceptionally well suited for effecting the cleavage of phenoxy methyl penicillin and its salts to produce 6-aminopenicillanic acid, and that besides enabling high yields of 6-aminopenicillanic acid to be obtained, it avoids the above-mentioned disadvantages of microorganisms which have been prevously suggested for doing this work. Up till now, the employment of basidiomycetes for the cleavage of penicillins has not been proposed. Nor has any member of this class been known to contain penicillinamidase.

In the process of the invention the *Pleurotus ostreatus* may with advantage be used in the form of a fermenting culture, or as a suspension of live or dead cells or as the dried powdered mycelium. However, autolysates or extracts of this microorganism may also be used for converting the above mentioned penicillin into 6-aminopenicillanic acid in accordance with the invention.

It is preferred to carry out the process by first saprophytically growing *Pleurotus ostreatus* in a nutrient solution containing assimilable growth supporting carbon and nitrogen sources as well as trace metals and, after one or more preliminary vegetative stages depending upon the capacity of the culture tank, at the end of a given prefermentation time, generally at the end of the growth phase, adding the penicillin which is to be converted and continuing fermentation until a sufficiently large part of the substrate consists of 6-aminopenicillanic acid. Alternatively, the fermentation process can be interrupted when the microorganism employed has reached the point of maximum enzyme concentration, the mycelium of the fungus or its cells being separated from the culture solution and the residue resuspended for instance in water, a physiological solution of common salt or a buffer solution, and intimately contacted with the substrate which it is desired to cleave. This is most conveniently done by shaking or agitation, the cleavage effect of the enzyme complex developing in aerobic conditions. The concentration of the penicillin used, which may be introduced to the cleavage process either continuously or in batches, is preferably so chosen by reference to the activity of the enzyme that the period of action will be only a few hours and not more than two days, thus fully exploiting the enzymatic effect whilst limiting the self-destruction of the penicillin and of the 6-aminopenicillanic acid formed to a minimum. The pH of the medium during cleavage may be between weakly acid and weakly alkaline. The optimum temperature is between 28 and 30° C., but the cleavage of phenoxy methyl penicillin and of its salts will also proceed at lower or higher temperatures, and similar considerations will apply as those which govern the choice of the enzyme and substrate concentrations for determining the cleavage time.

Examples of carrying out the process of the invention are given below to illustrate the invention.

*Example 1*

The mycelium of a parent culture of *Pleurotus ostreatus* (natural product) incubated for 14 days at 24° C. (nutritive substrate Sabouraud-dextrose agar, filled into 16 x 16 mm. test tubes in 5 ml. quantities and allowed to solidify in the slanting tubes) is washed with 5 ml. of a nutrient solution, of the composition given below, comminuted in a sterile test tube with a glass rod and then transferred into 20 ml. of a sterile nutrient medium of the following composition contained in a 100 ml. capacity, narrow-neck Erlenmeyer flask.

Nutrient medium:
  1 g. of nitrogen (in the form of a filtered beer yeast autolysate),
  50 g. of glucose,
  1 g. of $KH_2PO_4$,
  0.5 g. of $MgSO_4.7H_2O$,
  0.5 g. of $Ca(NO_3)_2$,
  0.1 g. of NaCl,
  0.05 g. of $FeSO_4.7H_2O$,
  Made up to 1000 ml. with fresh spring water, pH 6.0.

0.6% of sperm oil is added to the nutrient medium thus constituted. The nutrient medium is sterilised for 40 minutes in a steam autoclave at 120° C.

The inoculated nutrient medium in the flask is shaken on a rotary shaker, having a stroke of 40 mm. and running at 260 r.p.m., for 96 hours at 28° C. The mycelium of this first submerged culture stage is spherical and the whole of it is ground down to a pasty consistency under sterile conditions in a suitably large glass tube with a well fitting glass pestle.

10 ml. of this ground culture are used for inoculating the second submerged culture stage (500 ml. capacity, wide-neck Erlenmeyer flask filled with 100 ml. of the above nutrient medium). This inoculated medium is shaken on a rotary shaker having a stroke of 40 mm. and working at 260 r.p.m. for 96 hours at 28° C. The culture is then homogenised for 1 minute under sterile conditions in a suitable immersion mixer working at between 1000 and 1500 r.p.m. To this end the dispersing head of the mixer, having been steriliser for 30 minutes in a steam autoclave at 120° C., is introduced into the horizontally held culture flask which is opened under sterile conditions.

10 ml. of the homogenised product of the second submerged culture stage are now used for inoculating a culture vessel for a third submerged culture stage (500 ml. wide-neck Erlenmeyer flask, filled with 100 ml. of the above nutrient medium). The culture is shaken for 96 hours at 28° C. and then homogenised in the same way as described in connection with the preceding submerged culture stage.

For effecting the cleavage of the penicillin there are used 100 ml. capacity Erlenmeyer flasks, each containing 20 ml. of the above specified sterilised nutrient medium inoculated with 10%, i.e. 2 ml. of the above described third submerged culture. After 36 hours' shaking at 28° C. with a rotary shaking machine having a 40 mm. stroke and working at 260 r.p.m., 40,000 units of potassium phenoxy methyl penicillin (potassium V-penicillin) in solid form are added per ml. of the content of the flask. For determining the residual penicillin and of the 6-aminopenicillanic acid formed, two small samples are taken out at 8 hourly intervals. After extraction of the penicillin the ratio of the concentrations of the substrate and of the product of cleagage is iodometrically determined. After 48 hours 82% of the penicillin introduced is converted to 6-aminopenicillanic acid.

*Example 2*

100 ml. of the third submerged culture obtained as described in Example 1 are used to inoculate 4 liters of the sterile nutrient medium described in Example 1 in stainless steel submerged culture tanks of 10 liter capacity fitted with a Vortex aerating and agitating system. After 86 hours' fermentation (500 r.p.m., propeller type stirrer of 9 cm. diameter) the resultant fungus mycelium is separated from the culture medium, washed and suspended in 2 liters of a phosphate buffer, pH 7.0, and 100,000 units of phenoxy methyl penicillin acid are added thereto. After stirring for 36 hours, 94% of the penicillin introduced is converted to 6-aminopenicillanic acid.

*Example 3*

10 ml. of the homogenised submerged culture obtained from the second stage, as described in Example 1, are used for inoculating 40 ml. of the nutrient medium described in Example 1 in an Erlenmeyer flask of 500 ml. capacity. The flask is shaken for 66 hours at 30° C. on a rotary shaker with a 30 mm. stroke, working at 230 r.p.m. 300,000 units per ml. medium of potassium phenoxy methyl penicillin are then added. 24 hours later 85% of the penicillin has been converted to 6-aminopenicillanic acid.

*Example 4*

100 ml. of the following nutrient medium are introduced into each of several 2 liter capacity Erlenmeyer flasks:

1.5 g. of nitrogen (in the form of corn steep liquor, 50 g. dry substance),
75 g. of glucose,
1.5 g. of $KH_2PO_4$,
1.0 g. of $MgSO_4.7H_2O$,
1.0 g. of $Ca(NO_3)_2$,
0.2 g. of NaCl,
0.01 g. of $ZnCl_2$,
Made up to 1000 ml. with spring water,
pH 6.5.

The flasks are sterilised for 20 minutes at 120° C. and then each inoculated with 10 ml. of the homogenised product from the third submerged culture stage described in Example 1. The flasks are shaken at 26° C. for 48 hours by a reciprocating shaker performing one hundred and fifty 5 mm. strokes per minute. 50,000 units of potassium phenoxy methyl penicillin are then added per ml. of medium. At the end of a further period of 36 hours' shaking, 88% of the penicillin is found to have been converted to 6-aminopenicillanic acid.

*Example 5*

In order to obtain a larger volume of inoculant, the cultivation of the third submerged culture stage described in Example 1 was modified in that 50 ml. of the homogenised product from the second submerged culture stage were used for inoculating 2 liter capacity Erlenmeyer flasks, each filled with 500 ml. of the nutrient medium specified in Example 1. After the flasks have been shaken for 72 hours at 28° C. on a rotary 40 mm. stroke shaking machine running at 260 r.p.m., the contents of seven of the 2 liter flasks are used for inoculating a 100 liter capacity fermenting tank containing 75 liters of the nutrient medium described in Example 4 and fitted with equipment for stirring and aeration. After 96 hours' fermentation, during which a speed of 210 r.p.m. was maintained and 1 liter of air was supplied per liter of nutrient medium per minute, 60,000 units of potassium phenoxy methyl penicillin are added per ml. medium. The described conditions of fermentation are maintained and at the end of another 48 hours, 90% of the penicillin is found to have been converted to 6-aminopenicillanic acid.

*Example 6*

1.5 liters of the homogenised submerged culture from the third stage carried out as described in Example 5, are used as an inoculant for 17 liters of the nutrient medium of Example 1 contained in a 24 liter capacity deep culture tank provided with agitating and aerating equipment. Whilst being stirred at 450 r.p.m. and supplied with air at the rate of 0.8 liter per minute per liter of medium, this culture is allowed to ferment for 96 hours. 20,000 units of potassium phenoxy methyl penicillin are then added per milliliter of medium and fermenting is continued as above for another 30 hours at the end of which time 95% of the pencillin is found to have been converted to 6-aminopenicillanic acid.

*Example 7*

1% toluene is added to 100 ml. of the pulpy submerged culture from the third stage (96 hours old), carried out as described in Example 1 in a 500 ml. capacity wide-neck Erlenmeyer flask. This mixture is then autolysed on a magnetic type stirrer for 24 hours at 40° C. Then the culture is a thin liquid. 10,000 units of potassium phenoxy methyl penicillin in solid form per ml. autolysate are now added. After 24 hours 60% of the penicillin introduced is converted to 6-aminopenicillanic acid.

*Example 8*

The mycelium of 100 ml. of the homogenized submerged culture obtained from the third stage of Example 1 is separated from the liquid portions on a suction filter, and then washed 3 times with 100 ml. distilled water. The mycelium cake as obtained is frozen over night at a temperature of −20° C. Then, the mycelium is thawed and triturated in a porecelain basin. The product as obtained is shaken with 100 ml. distilled water for 1 hour at room temperature. The mixture is filtered and to the liquid extract 30,000 units per ml. potassium phenoxy methyl pencillin in solid form are added. After shaking this mixture for 30 hours at 37° C. 40% of the penicillin introduced is found to have been converted to 6-aminopenicillanic acid.

*Example 9*

1 liter of the homogenised submerged culture obtained from the third stage as described in Example 5 are centrifuged during 15 minutes at 3000 r.p.m. The mycelium and the liquid phase separate and after decantation of the liquid that covers the sediment the mycelium is washed 3 times with 1000 ml. distilled water. The mycelium is dried at room temperature in a vacuum of 10 mm. Hg, and then pulverized in a mixer. 20 g. of a dry powder are obtained. 2 g. of this powder are suspended in 100 ml. distilled water and 15,000 units potassium phenoxy methyl penicillin in solid form are added per ml. of the suspension; the mixture is kept at 25° C. without stirring. After 16 hours 23%, and after 40 hours 52% of the penicillin introduced is found to have been converted to 6-aminopenicillanic acid.

The 6-aminopenicillanic acid as obtained according to the preceding examples has been separated according to the process as described by Batchelor, F. R., Chain, E. B., Hardy, T. L., Mansford, K. R. L., Rolinson, G. N., Proc. of Royal Society, B, volume 154, pp. 498–508 (1961).

We claim:

1. A process for the production of 6-aminopenicillanic acid which comprises effecting enzymatic cleavage of a penicillin selected from the group consisting of phenoxymethylpenicillin and its salts by contacting the said penicillin with the microorganism *Pleurotus ostreatus* of the class of Basidiomycetes and recovering the 6-aminopenicillanic acid thus produced.

2. The process of claim 1, in which the said penicillin is contacted with the said microorganism under submerged aerobic conditions.

3. The process of claim 2, in which the said penicillin is added to a fermenting culture of the said microorganism.

4. The process of claim 2, in which the said penicillin is contacted with a suspension of the said microorganism in a non-nutrient medium.

5. The process of claim 4, in which the said non-nutrient medium is selected from the group consisting of water, a physiological solution of common salt and buffer solutions.

6. The process of claim 1, in which the said penicillin is contacted with an autolysate of *Pleurotus ostreatus*.

7. The process of claim 1, in which the said penicillin is contacted with an extract of *Pleurotus ostreatus*.

8. The process of claim 2, in which the said penicillin is contacted with a suspension of powdered mycelium of *Pleurotus ostreatus*.

9. A process for the production of 6-aminopenicillanic acid, which comprises growing the microorganism *Pleurotus ostreatus* of the class of Basidiomycetes in a nutrient medium in a number of submerged culture stages, intimately contacting the microorganism with a penicillin selected from the group consisting of phenoxymethylpenicillin and its salts under submerged aerobic conditions for a period of time sufficient to convert a major portion of the said penicillin to 6-aminopenicillanic acid and recovering the 6-aminopenicillanic acid thus produced.

10. The process of claim 9, in which the said penicillin is added during the final submerged culture fermentation stage and fermentation is continued until the required degree of conversion has taken place.

11. The process of claim 9, in which the said nutrient medium comprises assimilable growth supporting carbon and nitrogen sources, mineral salts and trace metals.

12. The process of claim 9, in which at the end of the final submerged culture stage, the mycelium is separated from the culture medium, washed and suspended in a phosphate buffer solution and the said penicillin is added thereto.

References Cited in the file of this patent
UNITED STATES PATENTS
3,014,846    Rolinson et al. _____ Dec. 26, 1961